US010298521B2

(12) United States Patent
 Oliszewski (10) Patent No.: US 10,298,521 B2
(45) Date of Patent: May 21, 2019

(54) SYSTEMS AND METHODS FOR CONNECTING LEGACY PRODUCTS VIA AN ANALOG TELEPHONE ADAPTER (ATA)

(71) Applicant: Michael Oliszewski, Portland, OR (US)

(72) Inventor: Michael Oliszewski, Portland, OR (US)

( * ) Notice: Subject to any disclaimer, the term of this patent is extended or adjusted under 35 U.S.C. 154(b) by 0 days.

(21) Appl. No.: 13/937,180

(22) Filed: Jul. 8, 2013

(65) Prior Publication Data
US 2014/0160920 A1    Jun. 12, 2014

Related U.S. Application Data

(60) Provisional application No. 61/668,977, filed on Jul. 6, 2012.

(51) Int. Cl.
| | | |
|---|---|---|
| *H04L 12/939* | (2013.01) | |
| *H04L 29/06* | (2006.01) | |
| *H04M 7/00* | (2006.01) | |

(52) U.S. Cl.
CPC ............ *H04L 49/557* (2013.01); *H04L 29/06* (2013.01); *H04L 65/103* (2013.01); *H04M 7/006* (2013.01); *H04M 7/0069* (2013.01)

(58) Field of Classification Search
CPC ..... H04L 49/557; H04L 29/06; H04L 65/103; H04M 7/006; H04M 7/0069; H04M 11/04; H04M 3/5116; G06F 19/3406; G06F 19/3418; G08B 13/00
See application file for complete search history.

(56) References Cited

U.S. PATENT DOCUMENTS

| | | | | |
|---|---|---|---|---|
| 5,398,277 | A * | 3/1995 | Martin, Jr. ........... | G08B 25/001 379/309 |
| 6,298,065 | B1 * | 10/2001 | Dombkowski et al. ...... | 370/420 |
| 6,496,282 | B1 * | 12/2002 | Malik .......................... | 358/405 |
| 8,705,716 | B2 * | 4/2014 | Gregory .................. | H04M 3/38 379/142.01 |
| 2001/0046259 | A1 * | 11/2001 | Abrishami ..................... | 375/222 |
| 2002/0101860 | A1 * | 8/2002 | Thornton ................ | H04L 12/14 370/352 |
| 2003/0093187 | A1 * | 5/2003 | Walker .............................. | 701/1 |
| 2003/0227540 | A1 * | 12/2003 | Monroe ........... | G08B 13/19634 348/14.02 |
| 2004/0037265 | A1 * | 2/2004 | Huang et al. ................. | 370/352 |
| 2005/0070315 | A1 * | 3/2005 | Rai et al. ...................... | 455/466 |
| 2005/0213565 | A1 * | 9/2005 | Barclay et al. .............. | 370/352 |
| 2005/0232243 | A1 * | 10/2005 | Adamczyk et al. .......... | 370/352 |

(Continued)

OTHER PUBLICATIONS

Mediant, "Mediant Installation Manual Version 6.0", Feb. 2010, Mediant, Version 6.0, pp. 1-76.*

*Primary Examiner* — Paul H Masur
*Assistant Examiner* — Michael K Phillips
(74) *Attorney, Agent, or Firm* — J. Curtis Edmondson; Law Offices of J. Curtis Edmondson (57) ABSTRACT

An apparatus and method for computer telephony communications, specifically for interconnecting legacy modem devices using an analog telephone adapter (ATA). A modem connection link is established from a PSTN modem device having an ATA device that may be connected to a IP transport medium (internet), where the IP transport medium is connected to a media interface and where the media server is also connected to a PSTN modem device with full data integrity, so that there is a successful data delivery via the PSTN modem.

1 Claim, 6 Drawing Sheets

(56) References Cited

U.S. PATENT DOCUMENTS

| | | | |
|---|---|---|---|
| 2006/0002403 A1* | 1/2006 | Bettis et al. | 370/401 |
| 2006/0007915 A1* | 1/2006 | Frame | 370/352 |
| 2006/0182091 A1* | 8/2006 | Park et al. | 370/352 |
| 2006/0233317 A1* | 10/2006 | Coster et al. | 379/45 |
| 2007/0041365 A1* | 2/2007 | Nejah | 370/352 |
| 2007/0132836 A1* | 6/2007 | Katz | G06Q 20/208 348/14.01 |
| 2007/0250900 A1* | 10/2007 | Marcuvitz | 725/141 |
| 2007/0259667 A1* | 11/2007 | Kim et al. | 455/440 |
| 2007/0266414 A1* | 11/2007 | Kahn et al. | 725/113 |
| 2007/0290830 A1* | 12/2007 | Gurley | G08B 13/1968 340/506 |
| 2008/0165789 A1* | 7/2008 | Ansari | G06Q 30/04 370/401 |
| 2008/0261515 A1* | 10/2008 | Cohn | H04Q 3/0025 455/3.06 |
| 2009/0175422 A1* | 7/2009 | Marics et al. | 379/45 |
| 2010/0061228 A1* | 3/2010 | Grabelsky | H04L 12/5692 370/221 |
| 2011/0058671 A1* | 3/2011 | Tomasso et al. | 380/255 |
| 2011/0169628 A1* | 7/2011 | Elliot | H04L 12/40013 340/506 |
| 2011/0313493 A1* | 12/2011 | Keenan | A61B 5/0031 607/60 |
| 2012/0106543 A1* | 5/2012 | King | H04L 45/22 370/352 |
| 2012/0124164 A1* | 5/2012 | Haff et al. | 709/217 |
| 2012/0250834 A1* | 10/2012 | Smith | H04M 11/04 379/45 |
| 2013/0003132 A1* | 1/2013 | Ashmore et al. | 358/442 |
| 2013/0163490 A1* | 6/2013 | Rodriguez | H04L 29/06387 370/310 |
| 2013/0279413 A1* | 10/2013 | Cote | G08B 25/10 370/328 |
| 2013/0346789 A1* | 12/2013 | Brunel et al. | 714/4.11 |
| 2014/0334496 A1* | 11/2014 | Ray | H04L 65/102 370/401 |
| 2015/0334087 A1* | 11/2015 | Dawes | H04W 4/001 726/12 |

* cited by examiner

PRIOR ART

SYSTEMS AND METHODS FOR CONNECTING LEGACY PRODUCTS VIA AN ANALOG TELEPHONE ADAPTER (ATA)

STATEMENT OF RELATED APPLICATIONS

This application claims the benefit of U.S. provisional application No. 61/668,977, filed on Jul. 6, 2012, the contents herein incorporated into this application by reference.

STATEMENT OF GOVERNMENT FUNDING

No government funding was used in connection with this patent application.

BACKGROUND

Technical Field

This invention relates to computer telephony communications, specifically an apparatus and method for interconnecting legacy modem devices using an analog telephone adapter (ATA).

Background

The modern computer telephony environment continues to evolve and adapt due to the introduction of the internet.

The greatest shift in computer telephony has been the deployment of Voice over IP (VoIP). VoIP involves sampling the voice channel into a digital format, packetizing the voice channel for transmission on the internet, receiving the digital packets, and then reconstructing the audio stream at the other side. VoIP operates effectively for human voice transmission due to the "bursty" nature of voice.

Unfortunately many devices, including modems, do not transmit or receive information in a "bursty" fashion, instead must communicate on a dedicated communications channel with minimal latency. Transmission of modem signals over IP can cause data loss due to the data transmission gaps in the audio stream that are a result of the IP channel.

Despite the popularity of IP, numerous devices use legacy PSTN interfaces to communicate information using the modem protocol. Examples of such device interfaces include:
1) Alarm Systems that typically use a modem or other device, using PSTN, for data transmission to a police station or a guard station.
2) Postal Meters that typically have an internal modem for data transmission to a post office or supplier.
3) Legacy Computer Systems that have internal modems which transfer data to another system over the PSTN.

What is common with these interfaces is that they all involve the use of modems to provide a data and/or fax connection to a PSTN networks.

PRIOR ART SOLUTIONS

A good overview of the problems associated with transmissions of data with a modem that is carried over the internet (i.e. via IP) is described in U.S. Pat. No. 7,397,793 filed on Apr. 5, 2004 by Urquizo.

A common problem with Modem over IP (MOIP) solutions is that they lack an easy to implement or a "turn-key" solution that does not require the end-user to understand anything more than disconnecting the modem from a dedicated PSTN connection and connecting it to dedicated IP based equivalent. Such a "turn-key" solution for MOIP should be at least as simple as installing a consumer grade wireless internet connection. These solutions are lacking in the marketplace. International standards have been proposed for MOIP which include the ITU V.150 standard.

U.S. Pat. No. 7,489,633 issued to Garakani, et. al on Feb. 10, 2009 and applied for on Sep. 24, 2002 describes a method for the implementation of a MOIP solution using a method of negotiating the transfer of data.

U.S Patent Application Publication 2009/0028168 filed by Somekh, et. al and published on Jan. 29, 2009 and filed on Jul. 30, 2008 describes a system of interconnecting modems through gateways.

DEFINITIONS

ATA—Analog Telephone Adapter.

G.729—G.729 is an audio data compression algorithm for voice that compresses digital voice in packets of 10 milliseconds duration. This specification is officially described as "Coding of speech at 8 kbit/s using conjugate-structure algebraic code-excited linear prediction (CS-ACELP")". Because of its low bandwidth requirements, G.729 is mostly used in Voice over Internet Protocol (VoIP) applications where bandwidth must be conserved. Standard G.729 operates at a bit rate of 8 kbit/s, but there are extensions, which provide rates of 6.4 kbit/s (Annex D, F, H, I, C+) and 11.8 kbit/s (Annex E, G, H, I, C+) for worse and better speech quality, respectively.

HTTPS—Hypertext Transfer Protocol Secure (HTTPS) is a communications protocol for secure communication over a computer network, with especially wide deployment on the Internet. Technically, it is not a protocol in and of itself; rather, it is the result of simply layering the Hypertext Transfer Protocol (HTTP) on top of the SSL/TLS protocol, thus adding the security capabilities of SSL/TLS to standard HTTP communications.

MOIP—Modem over Internet Protocol. A generic term for the transfer of modem signals of an IP network.

PSAP—Public Safety Answering Point A public-safety answering point (PSAP), sometimes called "public-safety access point", is a call center responsible for answering calls to an emergency telephone number for police, firefighting, and ambulance services.

SIP—Session Initiation Protocol. A signaling protocol used for the controlling communication sessions over the internet. SIP is an application layer protocol designed to be independent of the underlying transport layer.

VoIP—Voice Over Internet Protocol. A generic term for the transmission of voice signals, previously interfaced to PSTN networks, over the internet using the IP protocol.

SUMMARY

The present inventive subject matter overcomes problems in the prior art by providing a method of establishing a modem connection link from any PSTN modem device having an ATA device that may be connected to a IP transport medium (internet), where the IP transport medium is connected to a Media Interface, and where the Media Server is also connected to a PSTN modem device with full data integrity, so that there is a successful data delivery via the PSTN modem.

The inventive subject matter also has a modem connection link with a guaranteed fallback recovery mechanism that has been implemented at the sending side of a Modem Server. The modem connection link also has a method for modem protocol messaging so that of all messages are in accordance to directed standard modem messaging requirements.

Further, the inventive subject matter contemplates a modem connection link operated by a method for modem protocol messaging where all of the messages, in accordance with the T.38 directed standard modem messaging protocol, are communicated through the internet.

Likewise, the inventive subject matter includes a modem connection link with the ability to initiate and terminate a modem call through a user interface that is generated by the sending modem device. This modem connection link has user interfaces that support various modem file formats that are transmitted from the sending modem device to the receiving modem device. This modem communication link also includes a method having the inclusion of standard, fine and super fine modem file formats, the inclusion of these modem file formats dependent on transmitting and receiving modem devices capable of sending said file formats.

Also the inventive subject matter includes a method of establishing a connection link from any PSTN modem device; this method having the steps of:
   connecting an ATA device to an IP transport medium (internet),
   connecting a Modem Server to an IP transport medium, and then connecting a PSTN modem device with full data integrity to an IP transport medium, so that a successful modem delivery functioning in Model can be completed.

The inventive subject matter further has the steps of having a method of establishing modem connection link from any PSTN modem device where there is a guaranteed fallback recovery mechanism for the modem delivery, and where the modem delivery is implemented at the sending Modem Server.

Further, the inventive subject matter describes a method of establishing modem connection link from any PSTN modem device where the modem delivery has all messages sent in accordance to T.30 directed standard modem messaging requirements.

Also described is a method for establishing a modem connection link from any PSTN modem device where the modem delivery of data has all messages sent in accordance to T.38 directed standard modem messaging requirements and these messages are transported through the internet.

Further contemplated is the method of establishing a modem connection link from any PSTN modem device where this device has a modem delivery with the capabilities of initiating and terminating a modem call through the user interface from the sending modem device.

Also described in the inventive subject matter is a method of establishing a fully functioning synchronous modem connection link from any PSTN modem device having an ATA invention device and module, the ATA invention device and module connected to the IP transport medium (internet), a Modem Server including a module connected to a PSTN modem device with full data integrity, wherein the ATA invention device successful modem delivery is functioning in Mode3.

The inventive subject matter also describes a method of establishing a fully functioning synchronous modem connection link from any PSTN modem device where that device has a guaranteed fallback recovery mechanism implemented by the sending Modem Server.

The inventive subject matter also describes a method of establishing a fully functioning synchronous modem connection link from any PSTN modem device having all messages transmitted in accordance to T.30 directed standard modem messaging requirements.

The inventive subject matter also describes a method of establishing a fully functioning synchronous modem connection link from any PSTN modem device according to claim further having all messages in accordance to T.38 directed standard modem messaging requirements transported through the internet.

The inventive subject matter also describes a method of establishing fully functioning synchronous modem connection link from any PSTN modem device where this device has the capability of initiating and terminating a modem call through the user interface from the sending modem device.

Another embodiment of this inventive subject matter is a method of establishing a fully functioning synchronous modem connection link from any PSTN modem device with a calling scheme, the calling scheme capable of tunnelling the call simultaneously through the synchronous modem connection link while providing the recipient full control of routing to the nearest appropriate PSAP.

Also described is a method of establishing fully functioning synchronous modem connection link from any PSTN modem device further supporting various modem file formats transmitted from the sending modem device to the receiving modem device.

Also described is a method of establishing a fully functioning, synchronous modem connection link from any PSTN modem device where this device has a standard, fine and super fine modem file formats, and the file formats are dependent on the transmitting and receiving modem devices capable of transmitting and sending the standard, fine and super fine modem file formats.

The method of establishing a fully functioning synchronous modem connection link from any PSTN modem device having an ATA device where this device supports formats both at the transmitting and receiving modem devices, and also where the ATA invention device is supportive for all levels.

Also described is a method of establishing fully functioning synchronous modem connection link from any PSTN modem device where the device initiates a success message for the modem data that is transmitted both to the Modem Server and to the called modem device.

Further described is a method of establishing a fully functioning synchronous modem connection link from any PSTN modem device, where the device has a failure message, the failure message being created when the modem data is transmitted to the Modem Server.

The inventive subject matter also describes a method of establishing a fully functioning synchronous modem connection link from any PSTN modem device where all of the modem data being is stored on the Modem Server.

This method also describes a fully functioning synchronous modem connection link from any PSTN modem device that has all of the modem data being available to the sender of the original modem data transmission on the Modem Server.

This method also contemplates establishing a fully functioning synchronous modem connection link from any PSTN modem device further having all modem data being available for archival of confidential and secure information on the Modem Server.

This method of also contemplates establishing a fully functioning synchronous modem connection link from any PSTN modem device further having all modem data being stored on the Modem Server available for data mining and image scanning.

This method also further contemplates establishing a fully functioning synchronous modem connection link from any PSTN modem device further having error message(s) that report a failure in completing the modem call from the two communicating modem devices.

Also, this method further contemplates a fully functioning synchronous modem connection link from any PSTN modem device where the modem device generates an error message that reports the failure to complete modem where these messages are generated from failure messages that are created and returned by the transport mediums.

This method also establishes a fully functioning synchronous modem connection link from any PSTN modem device that has a mechanism and software module within an ATA device.

This method also establishes a fully functioning synchronous modem connection link from any PSTN modem device further managing a mechanism module within the Modem Server device working in conjunction with ATA device.

This method also provides for a fully functioning synchronous modem connection link from any PSTN modem device further having intelligent algorithms to monitor all messaging and transactional data.

This method also allows a fully functioning synchronous modem connection link from any PSTN modem device further having a plurality of intelligent algorithms and where the intelligent algorithms capable of recording all messaging and transactional data.

This method also establishes a fully functioning synchronous modem connection link from any PSTN modem device that has a plurality of intelligent algorithms and where these intelligent algorithms to controlling all message sequencing and data processing.

This method also establishes a fully functioning synchronous modem connection link from any PSTN modem device further having a plurality of intelligent algorithms, and where these intelligent algorithms to monitor all messaging and transactional data, wherein the intelligent algorithms have a master controller.

The inventive subject matter also contemplates a method of establishing fully functioning synchronous modem connection link from any PSTN modem device where there is a plurality of intelligent algorithms, these plurality of intelligent algorithms to recording all messaging and transactional data, wherein the intelligent algorithms have a master controller.

This inventive subject matter also contemplates a method of establishing a fully functioning synchronous modem connection link from any PSTN modem device, where the PSTN modem has a plurality of intelligent algorithms and the intelligent algorithms control all of the message sequencing and data processing, and where the intelligent algorithms also have a master controller.

These and other embodiments are described in more detail in the following detailed descriptions and the figures.

The foregoing is not intended to be an exhaustive list of embodiments and features of the present inventive subject matter. Persons skilled in the art are capable of appreciating other embodiments and features from the following detailed description in conjunction with the drawings.

DETAILED DESCRIPTION

Representative embodiments according to the inventive subject matter are shown in FIGS. 1-5, wherein similar features share common reference numerals.

Figure 1:
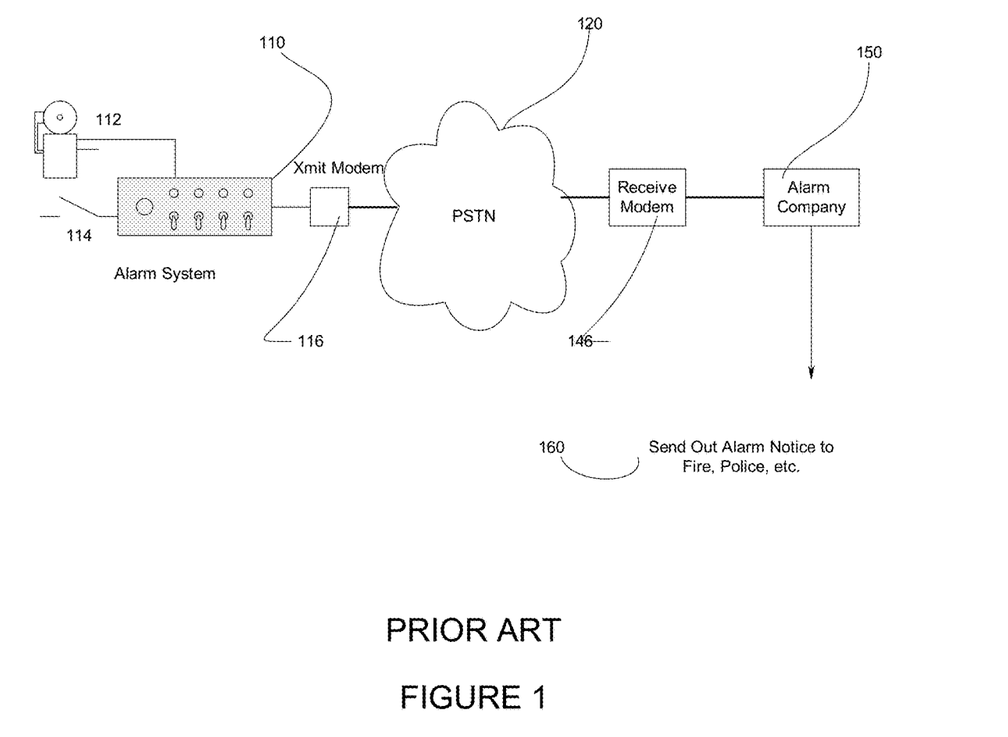
FIG. 1 depicts the prior art interface of the legacy modem system to an alarm system.

FIG. 1 shows a prior art high-level basic diagram of an alarm system 110 with a modem interface 116 which is connected to the PSTN 120 ("Public Switched Telephone Network"). The PSTN 120 is connected to the receive modem 146 which is further connected to the alarm company 150. This signal triggers a signal to alert 160 the fire, police, etc.

Those skilled in the art will recognize that a number of devices operate in the same way as the alarm system 110 connected to the PSTN 120. These devices include postal meters, legacy computer systems with modem interfaces, and process control devices. This is because the "device-modem-PSTN" interface is almost ubiquitous as a topology for communicating data. But the rise of the internet has established an alternate communications interface, this alternate communications interface growing in importance during in the late 1990's.

Figure 2:
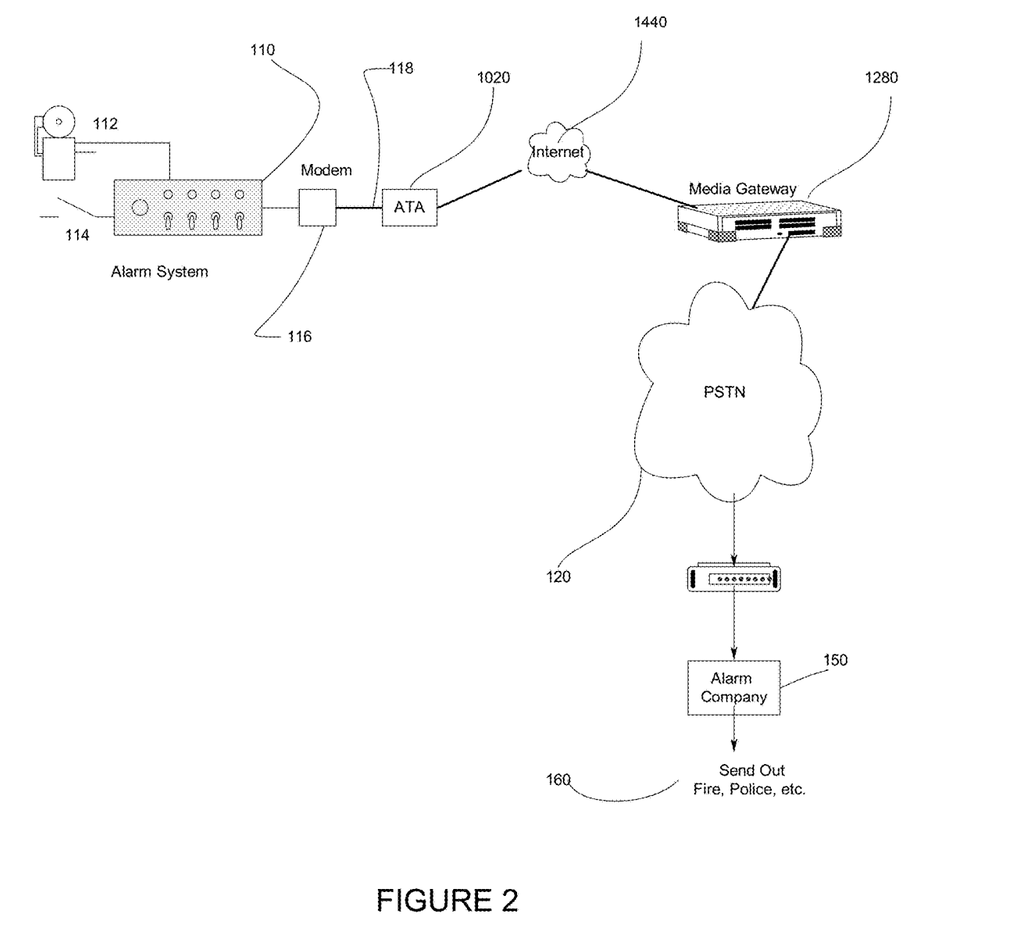
FIG. 2 shows a high-level basic diagram of a representative alarm system connected to an Analog Telephone Adapter.

Now referring to FIG. 2 which depicts an alarm system 110 with modem 120 interface. The modem 116 is connected to an intelligent HTTP(s) enabled ATA 1020 via the Internet 1440 connected to a remote streaming media gateway 1280 via a PSTN interface 118. The alarm system 110 initiates a modem data transfer with a remote streaming media gateway 1280 via a simple binary or XML web service HTTP(s) request.

The flow of modem data through FIG. 2 is as follows:
a) Transmitting Modem Device 116 sends alarm data from the alarm system 110 to the ATA 1020.
b) The ATA 1020 streams the packetized alarm data to the internet 1440.
c) This packetized alarm data may also be routed through firewalls and/or gateways prior to it being transmitted to the internet 1440.
d) In the internet 1440 the alarm data is then transferred to a media gateway 1280.
e) The media gateway 1280 then depacketize's the alarm data and converts the alarm data to a PSTN 120 format.
f) The alarm data is then sent through the PSTN 120.
g) The receiving alarm company's 150 modem then receives from the PSTN 120 a phone signal and transmits it to the alarm company equipment.

Examples of ATA's 1020 (analog telephone adapters) are the Cisco ATA 186 or the Linksys PAP2T. ATA's are designed to communicate with a server using a protocol such as H.323, SIP, and MGCP, and encoding and decoding the voice signal using a voice codec such as G.711, G.729, GSM, iLBC or others.

Examples of remote streaming media gateway 1280 would include, but are not limited to, the Audiocodes Mediant 1000 (see Audiocodes, www.audiocodes.com) or the Realtime Technologies VoIPIS ISDN PRI Trunk Gateway.

Figure 2A:
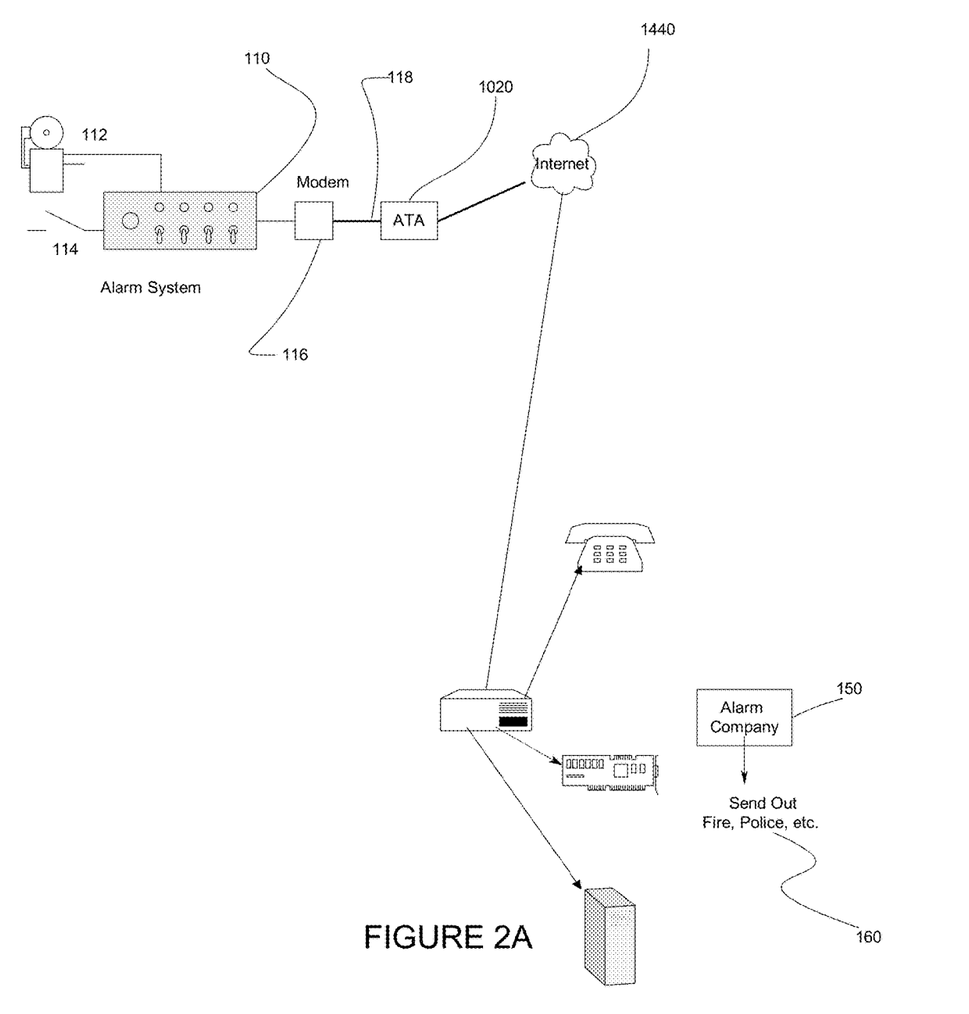
FIG. 2A shows an alternate embodiment of the high-level basic diagram of a representative alarm system connected to an Analog Telephone Adapter.

Now referring to FIG. 2A which provides an alternate embodiment connecting the alarm system 110 to the modem 116 which is connected to an ATA 1020. The ATA 1020 is further connected to the internet 1440 which is then interfaced to a computer that has peripheral attachments to the phone company.

Figure 3:
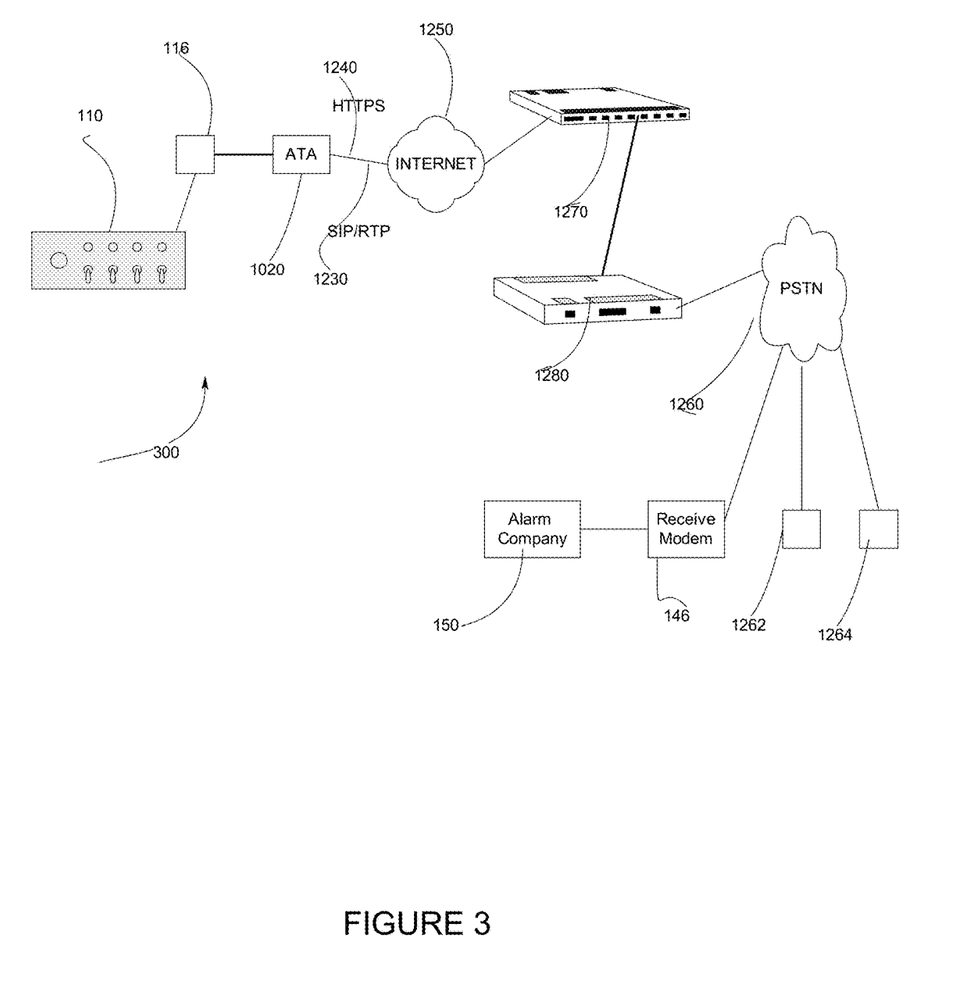
FIG. 3 illustrates a diagram of an alarm system connected to a media server.

Now referring to FIG. 3 which provides a network diagram 300 of a system that would support a "Two Call, Full Audio Support Mode" (SIP G.729 Audio). As shown in FIG. 3, a source modem 116 is connected to an ATA 1020. The ATA 1020 supports both SIP/RTP audio connections 1230 and/or HTTPS modem data connections 1240. These connections (e.g. SIP/RTP 1230 and HTTPS modem data 1240) are connected via the internet. The internet supports connections to the PSTN 1260 and/or the real-time media server 1270. The real-time media server 1270 is then connected to a media gateway 1280 which is further connected to the PSTN 120. The PSTN 120 is further connected to either a voice connection 1262, or a modem connection 1264. As noted the PSTN 120 is connected to the receiving modem 146 which is connected to the alarm company 150.

Figure 4:
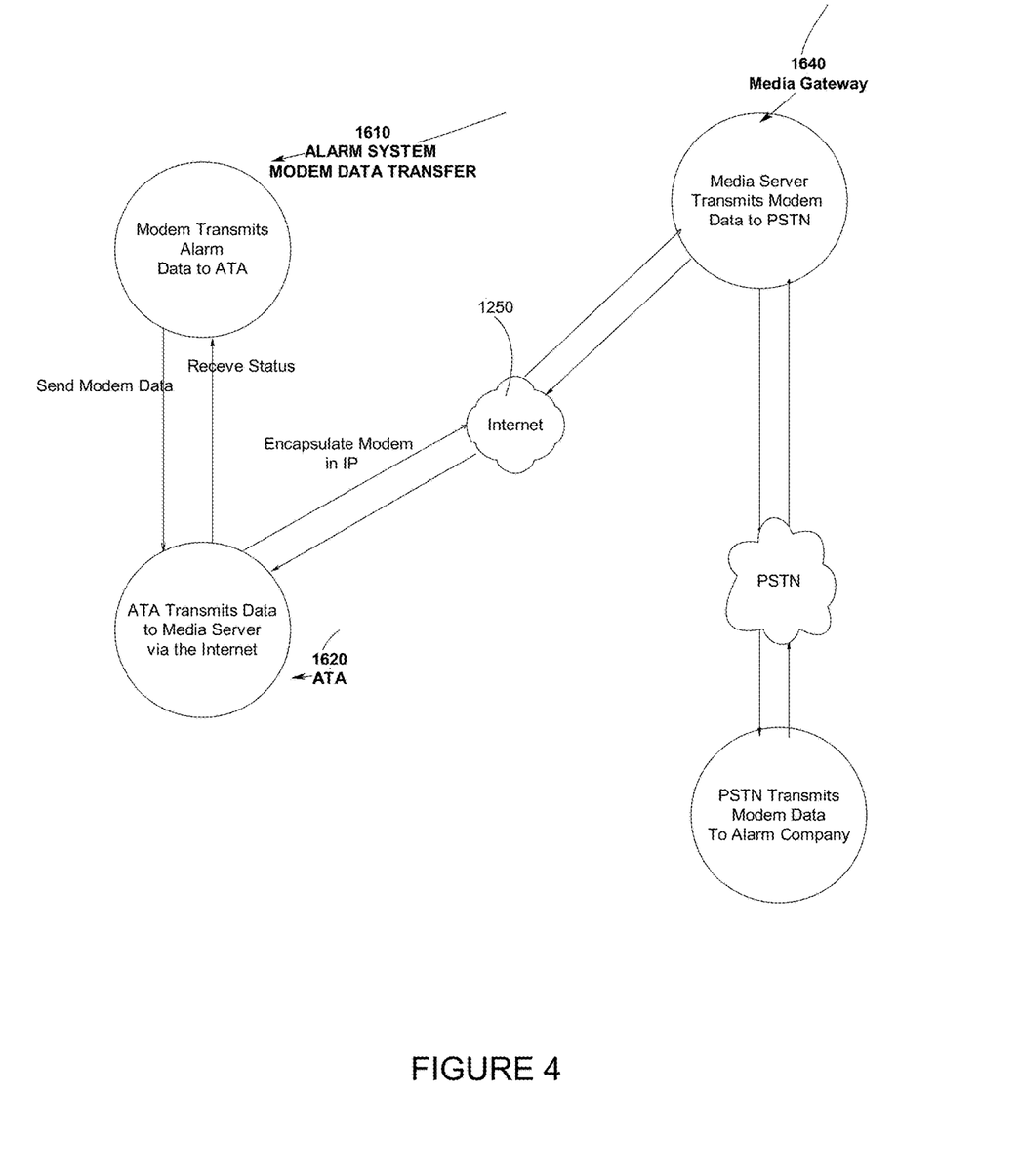
FIG. 4 describes the flow of information between the alarm system and the alarm company.

Now referring to FIG. 4 which illustrates that flow of information from the alarm system to the ATA. 1610. The ATA then receives the alarm information and transmits it to the internet via established IP protocols. 1620. The IP data is the received by a Media Server which translates the data into a format acceptable by the PSTN. 1640. Likewise, status information is transmitted from the alarm company back to the modem along the return path. 1640-1630-1620-1610.

Figure 5:
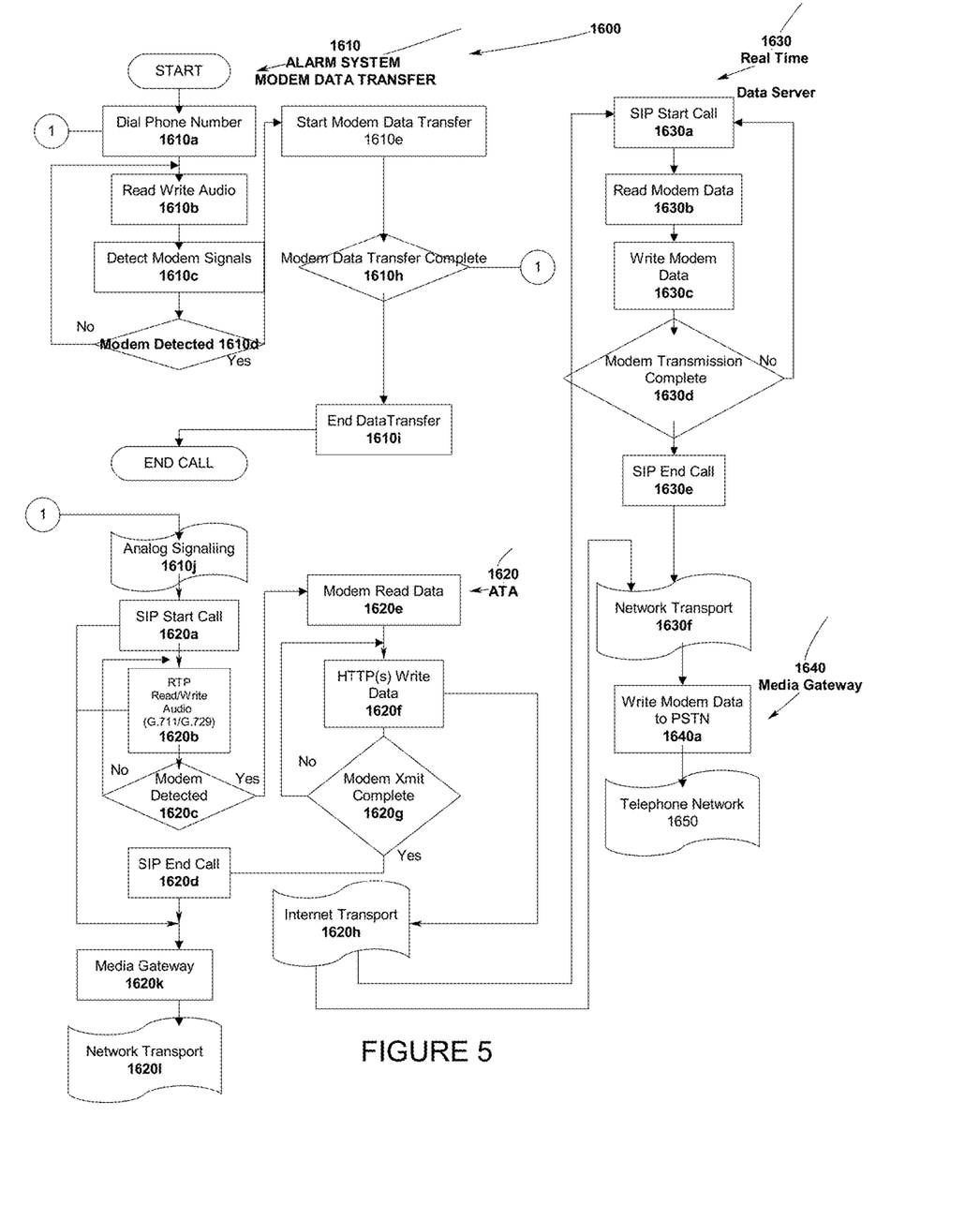
FIG. 5 depicts a high-level flow chart of the transfer of data using the modem connected to an Analog Telephone Adapter.

Now referring to FIG. 5. FIG. 5 depicts a detailed flowchart 1600 for the sending an alarm data across the network as previously shown in FIG. 2.

In FIG. 5 involves the steps of:
a) The legacy alarm system streams/transmits modem data to the ATA using T.30. Step 1610. This involves the substeps of:
  1. The legacy alarm system sending codes to dial the phone number via the modem. Step 1610a.
  2. Establishing a modem connection with the ATA. Steps 1610b, 1610c.
  3. Once the modem has established with the ATA the data is transferred from the modem to the ATA. Steps 1610d, 1610e.
  4. Once the modem data transfer is complete to the ATA, the modem "hangs up" and the transfer of data is complete.
b) The ATA streams modem data to the media server via HTTP(s). Step 1620. This ATA streaming involves the substeps of:
  1. SIP Start Call. Step 1620a.
  2. RTP Read/Write Audio (G.711/G.729). Step 1620b
  3. Wait for Modem to Transmit Data. Step 1620c.
  4. When the Modem starts transmitting data, read the modem data and place it into a queue for the ATA to transmit. 1620e.
  5. Transmit the modem data via HTTP(s) over the internet 1620f. 1620f. See Steps 1630a-f for receipt by the media server
  6. Test to see if the modem data transmission is completed 1620g
  7. If the modem data transmission is completed, then the SIP call will be ended on the ATA. 1620d.
c) The media server streams the modem to media gateway via SIP and associated protocols. Step 1630.
d) The Media Gateway streams modem data to PSTN. Step 1640.
e) The Media Gateway Server notifies the ATA of the result. The ATA sends a modem confirmation code to Alarm System.

The mechanism for the synchronized processing of the modem data requires implemented components on both ATA device and the media server. These components will be the controlling mechanism to the entire modem call and the processing of the modem data. The sequence of the call, messages, and data will be recorded, monitored and managed from the invention components enabled with this mode of operation.

There will be a series of RTP/SIP messages to be created and transmitted from the ATA device 116, though the Firewall to IP network 1250, the media gateway 1280, and the switched based network PSTN 1260, where the reply RTP/SIP message will update the controlling components on both the ATA device 116 and media gateway 1280. These messages are in full compliance to support modem devices 116 and to manage the components between the ATA device 116 and media gateway 1280. This messaging and controlling or the communications will occur instantaneously and automatically from the point-to-point synchronizing algorithms written for the invention components implemented for both the ATA device 116 and media gateway 1280.

The component messaging will be handled with the highest of priority to retain full instantaneous synchronization between the ATA device 1020, media gateway 1280 without impact to the Receiving Modem, thus fully supporting synchronous mode of operation. The messages sent between implemented components will contain a set of base identifiers.

The following set of fields will be stored in the Modem Server Timer Sequencer module: ATA Unique identifier, Modem Call Unique identifier, modem call progress, data call progress, modem server timing, ATA timing.

The following set of fields will be stored in the ATA Timer Control module: modem Server Unique identifier, ATA timing, modem server timing, modem call progress, data call progress. The ATA Timer Control module will be the controlling master to the modem call synchronization and all actions thereafter taken.

Synchronized Modem Transmission Mode:

The origination of the modem call requires a message to be sent through the connection of the modem device 116, ATA device 1020, IP network 1440, Media Gateway 1280, a Firewall, public switched based network PSTN 120, modem device 150 and a reply message is available to accept the call and to receive the modem data transmission. This transmission is referred to as: "live time" modem communication but is controlled, monitored and managed by the ATA Timer Control module in conjunction with the modem Server Timer Sequencer module after the user has initiated the modem call. After the message has been successfully transmitted through the network, the appropriate acceptance response message has been successfully transmitted back to the originating device and registered in the ATA Timer Control module the sending modem device 116 and receiving modem device are ready to begin image processing of the transmissions. The ATA Timer Control module will manage all communications events relevant to the successful processing of the modem call and modem data transmission.

Once the alarm data has been completely transmitted from the sending modem device 116 and verified received accurately on the receiving modem device then another message with status of the transaction is processed and recorded in the ATA Timer Control module and paired transaction message recorded on the modem Server Timer Sequencer module.

The receiving modem device sends a transaction status message back thru the network to the sending modem device 116 providing status check of either a successful or error receipt of the modem data transferred. Then both systems disconnect ("hang up") the modem call. This is all in accordance with the management of the call by the ATA Timer Control module.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

I claim:

1. A method of establishing a modem connection link from a public switched telephone network modem to an alarm processing system comprising:

coupling an alarm data generated from an alarm system to a sending modem;

coupling the sending modem to an analog telephone adapter to transmit the alarm data, coupling the analog telephone adapter to a first internet connection of an IP network, receiving the alarm data from the first internet connection of the IP network and communicating the alarm data to a media gateway, the media gateway capable of supporting an HTTPS protocol and further capable of interfacing to the public switched telephone network;

monitoring, by an analog telephone adapter timer control module in conjunction with a timer sequencer module, one or more unique data fields for a live time communication;

receiving the alarm data from the media gateway and transmitting the alarm data to a receiving modem of a receiving computer system via the public switch telephone network so that the alarm company computer system receives the alarm data;

monitoring, a reception, a complete transmission and verifying an accurateness of reception of the alarm data at the receiving computer system;

transmitting the live time communication, controlled by the analog telephone adapter timer control module in conjunction with the timer sequencer module;

sending a series of RTP/SIP messages from the analog telephone adapter through a firewall to the IP network, the media gateway, the public switch telephone network and the receiving modem of the alarm processing system, where a reply RTP/SIP message, returned back from the receiving modem updates a controlling component of the analog telephone adapter and the media gateway regarding the status of the live time communication; and synchronously controlling the live time communication; occurring between the analog telephone adapter and the receiving modem of the receiving computer system.

\* \* \* \* \*